No. 859,267. PATENTED JULY 9, 1907.
D. & C. D. VOLLMER.
OVEN DOOR.
APPLICATION FILED APR. 17, 1907.

2 SHEETS—SHEET 1.

WITNESSES:

INVENTORS
Daniel Vollmer and
Charles D. Vollmer
BY
ATTORNEY.

No. 859,267. PATENTED JULY 9, 1907.
D. & C. D. VOLLMER.
OVEN DOOR.
APPLICATION FILED APR. 17, 1907.
2 SHEETS—SHEET 2.
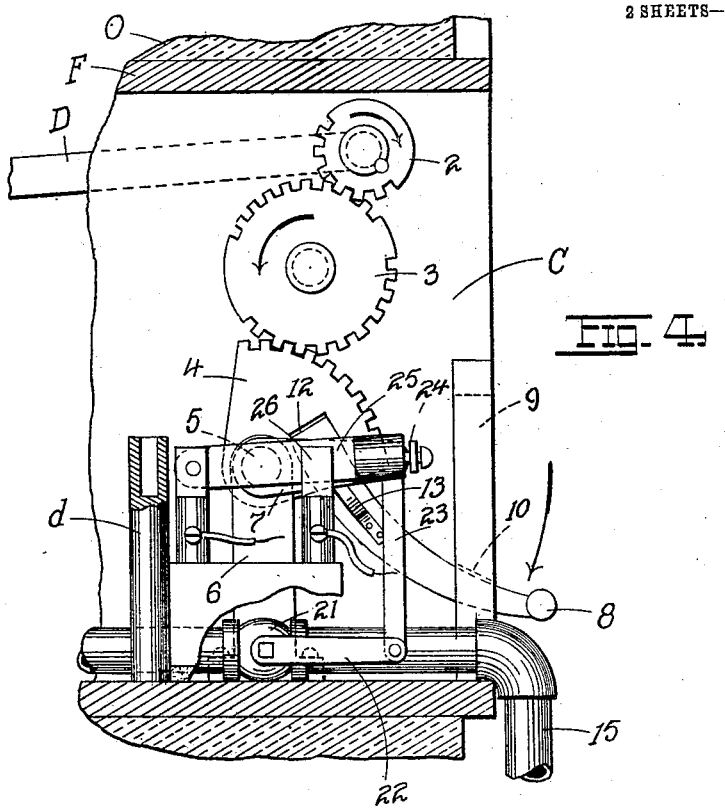
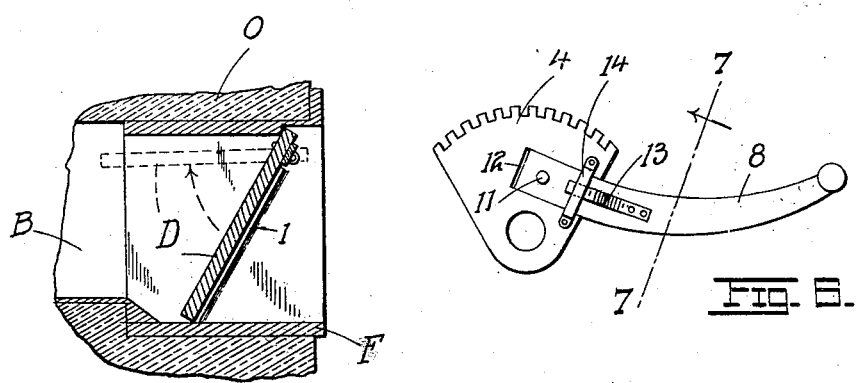
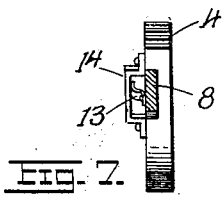
WITNESSES:
INVENTORS
Daniel Vollmer and
Charles D. Vollmer
BY
ATTORNEY.

UNITED STATES PATENT OFFICE.

DANIEL VOLLMER AND CHARLES D. VOLLMER, OF ST. LOUIS, MISSOURI.

OVEN-DOOR.

No. 859,267.   Specification of Letters Patent.   Patented July 9, 1907.

Application filed April 17, 1907. Serial No. 368,738.

*To all whom it may concern:*

Be it known that we, DANIEL VOLLMER and CHARLES D. VOLLMER, citizens of the United States, residing at St. Louis, State of Missouri, have invented certain new and useful Improvements in Oven-Doors, of which the following is a full, clear, and exact description, reference being had to the accompanying drawings, forming a part hereof.

Our invention has relation to improvements in oven-doors; and it consists in the novel details of construction more fully set forth in the specification and pointed out in the claims.

Figure 1:
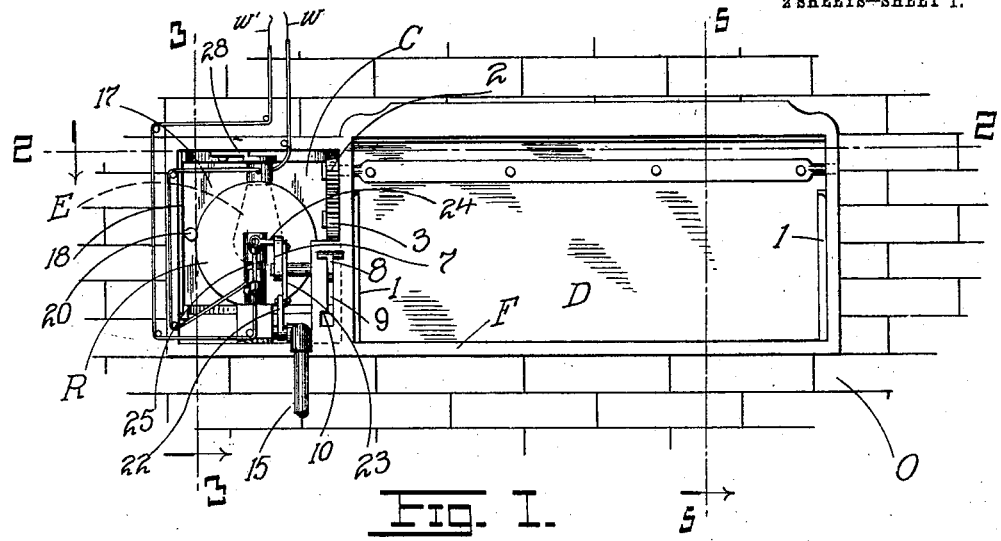
Figure 2:
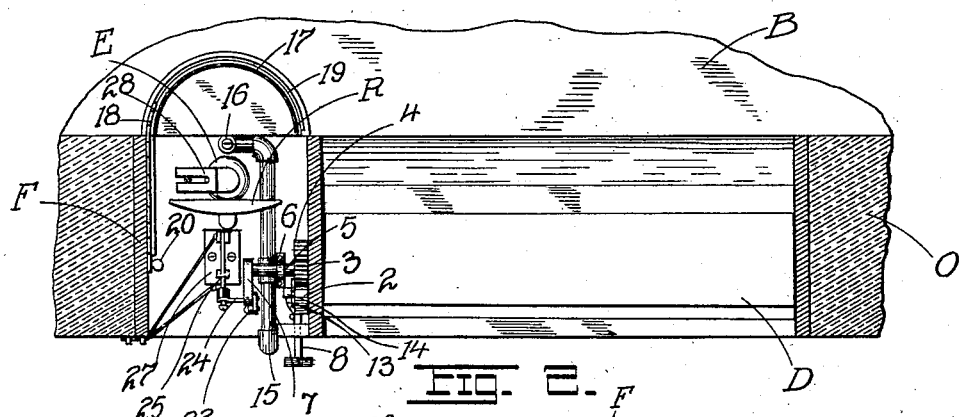
Figure 3:
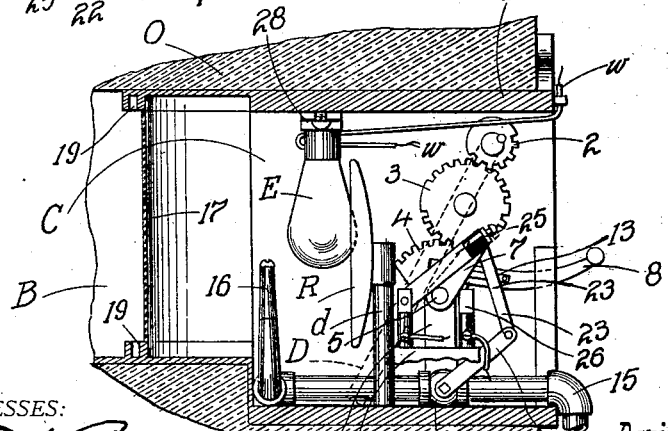

In the drawings, Figure 1 is a front elevation of a section of a bake oven showing our invention applied thereto, the oven-door being closed; Fig. 2 is a horizontal section on the line 2—2 of Fig. 1; Fig. 3 is a vertical transverse section on line 3—3 of Fig. 1; Fig. 4 is a similar section with parts moved to swing the door to an open position; Fig. 5 is a vertical transverse section on the line 5—5 of Fig. 1; Fig. 6 is a detail connection of the operating lever and the segment carried by the rock-shaft; and Fig. 7 is a cross section on the line 7—7 of Fig. 6.

The present improvement is specifically designed for bake-oven doors, the object being to equip the oven with means for illuminating the interior of the oven whenever the door is swung open to either inspect the contents of the oven, or for purposes of removing the articles being baked in the oven, at the termination of the baking operation. In our invention, the oven-door in swinging or moving to an open position either opens a gas-valve controlling the flow of gas to a suitable burner so that the gas is turned on full and the necessary light is produced to illuminate the interior of the oven, or in such movement an electric circuit supplying a current to an incandescent lamp, is closed, producing a similar result. The invention presents advantages and features of construction better apparent from a detailed description thereof, which is as follows:

Referring to the drawings, O, represents a portion of a conventional form of oven, the opening leading to the baking compartment B, being normally closed by a door D preferably hinged along its upper edge and swinging upward for an open position. The door rests when closed, with its lower edge at the base of the door frame F, its sides engaging suitable inclined strips 1, 1, to make a tight joint. At one end of the hinge-axis of the door is a pinion 2, which meshes with a partially-toothed disk 3 mounted in a special chamber or housing C contiguous to the door-opening, the teeth of the gear 3 meshing with the toothed segment 4 carried by a rock-shaft 5 supported in the division wall between the housing C and door-opening, and in a bearing 6 in the housing C, the inner end of the shaft terminating in a crank-arm 7. The shaft 5 is actuated by a lever 8 projecting through an elongated slot 9 in the front wall of the frame F, a shoulder 10 being formed at a convenient point along the slot for locking the lever in position and against a closing movement of the door D, once the latter has been swung to an open position. The inner end of the lever 8 is secured to a stud or pin 11 at the base of a depression or socket 12 of the segment 4 which receives the lever, the connection between the stud and lever being sufficiently loose to allow for a slight lateral movement of the lever to engage the locking shoulder 10. Normally, the lever is kept in the slot 9 by a flexed spring 13 secured to the lever, the free end of the spring bearing against a strap 14 which spans the lever (Fig. 7). When the lever has oscillated opposite the shoulder 10, a slight lateral pressure (against the resilience of the spring 13) will force the lever under the shoulder, the weight of the door holding it against any possible disengagement until disengaged by the operator.

Entering the chamber or housing C from the front of the oven is a gas-supply pipe 15 which terminates in the rear of such chamber in a burner-tip 16, the rear wall of the chamber being curved and preferably formed of mica or other transparent non-combustible material 17. This transparent wall or mica window may be furnished with a curtain or shade 18 made up of a series of hinged sections, operating in grooves or ways 19, the forward section being provided with a tongue or knob 20 by which the curtain can be seized and operated. The curtain is shoved in front of the mica window whenever it is necessary to protect the mechanism contained in the housing C from the heat of the baking compartment, especially when a fire is first built in the compartment to raise the brick floor on which the articles are baked, to the required temperature. Disposed in the gas-pipe 15 below the rock-shaft 5 is a rotary or rock-valve 21 of ordinary construction to whose stem is secured a crank-arm 22, said arm 22 being coupled to the crank-arm 7 by a link 23. So that with any rocking of the shaft 5, a corresponding oscillation of the arms 7 and 22 will take place, and hence a rocking of the gas valve 21 will follow. Since the door D is opened by a rocking of the lever 8 in one direction, and closed by a swinging thereof in the opposite direction, so it follows that the valve 21 shuts off the supply of gas to the burner with a swinging of the lever corresponding to the closed position of the door, and turns on the gas for a swinging of the lever for an open position of the door. In practice (where gas is used) the gas is not altogether cut off, but for the cut-off position a pilot flame is allowed to burn from the burner tip for convenience. To throw the light to any part of the oven a reflector R is employed, the same being rotatable in a horizontal plane and mounted on a socket $d$ in front of the burner tip.

Where electricity as the lighting agent is available, we connect the crank-arm 7 of the rock-shaft, by means of a link 24, to an oscillating electric switch lever or arm 25, which for the open position of the door (or the downward throw of the lever 8) is forced into electric contact with the contact arms 26 forming elements in a circuit represented by the insulated wires $w$, $w'$, leading from the base 27 on which the switch is mounted to a suitable source of electric energy (not shown) and to the socket of an electric lamp E, suspended at the end of a swinging and folding bracket 28 near the roof of the housing C. The bracket 28 with its lamp may be swung to one side out of the way, and the lamp unscrewed, should it be desirable to use gas, or in cases where gas might be preferred on account of its cheaper cost.

When it is desirable to use gas and not electricity as the lighting agent, we disconnect the link 24 which couples the switch 25 to the crank-arm 7 of the rock-shaft so that the electric circuit remains permanently broken; where electricity is to be used, and not gas, we disconnect the link 23 which thus allows the gas-valve to remain permanently closed (it being given a slight turn by hand to put out the pilot flame), so that either one lighting agent or the other can at any time be placed into service.

From Fig. 2 it will be seen that the curtain 18 is drawn out so as to clear the rear window of the housing C. When a fire is first built on the floor of the baking compartment B as is the case with the old style of oven, the curtain is pushed back in front of the mica window so as to temporarily protect the same from the smoke, heat, flame, and gases of such a fire. In other kinds of ovens the compartment in which the articles are baked is heated by products passing through special flues leading from a fire-box underneath the compartment.

Having described our invention, what we claim is:

In combination with the baking compartment of an oven, a gas-pipe terminating in a burner at one end of the compartment, an incandescent electric lamp located in position to illuminate said compartment, conducting wires leading to said lamp, a hinged door normally closing the baking compartment, a rock-shaft for actuating the door, a crank-arm on the shaft, an electric switch lever-arm for closing and breaking the circuit, a rock-valve for controlling the flow of gas through the pipe to the burner, a crank-arm coupled to the spindle of the rock-valve, a link coupling the aforesaid crank-arms, a link coupling the crank-arm of the rock-shaft with the switch lever-arm, the one light source or the other being serviceable according to the link remaining in coupled relation with the rock-shaft, substantially as set forth.

In testimony whereof we affix our signatures, in presence of two witnesses.

DANIEL VOLLMER.
CHARLES D. VOLLMER.

Witnesses:
EMIL STAREK,
MARY D. WHITCOMB.